(12) United States Patent
Mihara (10) Patent No.: US 6,233,097 B1
(45) Date of Patent: May 15, 2001

(54) SECONDARY IMAGE FORMATION TYPE VIEW FINDER INCLUDING TWO HALF MIRRORS

(75) Inventor: Shinichi Mihara, Tama (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/457,766

(22) Filed: Dec. 10, 1999

Related U.S. Application Data

(62) Division of application No. 09/177,530, filed on Oct. 23, 1998, now Pat. No. 6,018,416.

(30) Foreign Application Priority Data

Oct. 29, 1997 (JP) ..................................................... 9-311621

(51) Int. Cl.⁷ ........................... G02B 27/14; G02B 23/14; G03B 7/099; G03B 13/02
(52) U.S. Cl. ........................... 359/633; 359/423; 359/638; 396/271; 396/272; 396/384; 396/385
(58) Field of Search ..................... 359/633, 638, 359/629, 423, 431, 434, 400; 396/271, 272, 384, 385

(56) References Cited

U.S. PATENT DOCUMENTS

| 4,432,626 | 2/1984 | Ohtake . |
| 4,972,216 | * 11/1990 | Ueda et al. ........................ 396/384 |
| 5,084,780 | 1/1992 | Phillips . |
| 5,457,511 | 10/1995 | Kanai et al. . |

FOREIGN PATENT DOCUMENTS

| 63-259526 | 10/1988 | (JP) . |
| 64-68738 | 3/1989 | (JP) . |
| 1-185622 | 7/1989 | (JP) . |
| 1-222214 | 9/1989 | (JP) . |
| 2-96727 | 4/1990 | (JP) . |

* cited by examiner

*Primary Examiner*—Jon Henry
(74) *Attorney, Agent, or Firm*—Pillsbury Winthrop LLP

(57) ABSTRACT

A secondary image formation type view finder comprising an objective optical system, a first mirror for folding an optical axis, a relay lens system and a second mirror for folding the optical axis, wherein an optical axis of the relay lens system is disposed so as to be included in a plane nearly perpendicular to an optical axis of the objective optical system, and the first mirror and the second mirror and disposed nearly in parallel with each other, thereby reducing a space to be occupied by the view finder.

10 Claims, 7 Drawing Sheets

FIG. 9

SECONDARY IMAGE FORMATION TYPE VIEW FINDER INCLUDING TWO HALF MIRRORS

This is a division of application Ser. No. 09/177,530, filed Oct. 23, 1998 now U.S. Pat. No. 6,018,416.

BACKGROUND OF THE INVENTION a) Field of the Invention

The present invention relates to a secondary image formation type view finder which is suited for use in single-lens reflex cameras using electronic image pickup devices such as CCDs.

b) Description of the Prior Art

In these days, electronic cameras (digital cameras) are attracting attention as cameras which are to used by the next generation in place of silver salt 35 mm film cameras. In diagonal lengths, image pickup devices used in the electronic cameras are several to scores of fractions of a silver salt 35 mm film. Accordingly, a focal length of a view finder optical system must be shortened when an electronic camera is to be configured as a single-lens reflex camera. Further, it is necessary to dispose an image erecting optical system between a primary imaging surface on a side of a view finder and an eyepiece optical system. Furthermore, an effective sectional area must be large in the image erecting optical system since a pupil diameter and a location of the view finder are constant regardless of a focal length of the eyepiece optical system and it is necessary to reserve a sufficiently wide field angle for upgraded cameras.

When a prism is disposed to fold an optical path of the view finder optical system so that a space to be occupied by the view finder optical system is reduced for meeting the requirements described above, the optical path is prolonged and a heavy burden is imposed on a power distribution in the eyepiece optical system, thereby aggravating aberrations which are related to image legibleness.

The burden to be imposed on the eyepiece optical system can be lessened by adopting a secondary image formation type optical system which images an image formed by a photographic optical system once in the view finder optical system as described above and reimages it with a relay lens system.

When a splitting mirror is to be used for forming a secondary image, it is desirable to select a half mirror which does not require so large a space, or more desirable to use a prism type half mirror in particular which has a small folding angle. Further, a secondary image formation type optical system uses, for light measurement, a half mirror which takes out a portion of a light bundle from the photographic optical system or the viewfinder optical system and leads it to a light measuring element.

As conventional examples of the optical system described above, there are known optical systems disclosed by Japanese Patents Kokai Publication No. Sho 63-259526, Kokai Publication No. Hei 1-185622, Kokai Publication No. Hei 1-222214 and so on.

When an object is to be photographed with a camera in an outdoor environment, the object is illuminated mostly by sunlight. Though the light from the sun is a random natural light, rays reflected by the object may be partially polarized. Accordingly, certain kinds of objects cause light bundles which are mixed with polarized light bundles to be incident onto electronic cameras.

Since half mirrors have polarization characteristics, on the other hand, their reflectance and transmittance are varied when light bundles which are polarized to certain degrees are incident on the half mirrors.

Conventional optical systems are unusable for accurate light measurements since polarization is not taken into consideration for designing these optical systems and partial polarization at different degrees varies rays which are incident on light measurement systems thereof.

SUMMARY OF THE INVENTION

A primary object of the present invention is to provide a secondary image formation type view finder for single-lens reflex cameras which is configured compact enough to be laid even in compact cameras by adopting an adequate power distribution for an optical system thereof so that it has a shortened total length and selecting adequate bending locations for optical axes, etc. so that it occupies a reduced space, and to favorably corrects aberrations related to image legibleness.

The view finder according to the present invention is characterized in: that it is composed, in order from the object side, of an objective optical system, a first condenser lens system which is disposed in the vicinity of an imaging point of the objective optical system, a first mirror which folds an optical axis (of the first condenser lens system), a relay lens system for erecting an image (which is disposed on the optical axis folded by the first mirror), a second mirror for folding an optical axis (of the relay lens system), a second condenser lens system which comprises a reflecting surface for further folding the optical axis folded by the second mirror and an eyepiece optical system; and that it is configured so that an optical axis of the relay lens system is included in a plane which is nearly perpendicular to an optical axis of the objective optical system, and the first mirror and the second mirror are disposed nearly in parallel with each other.

Further, the secondary image formation type view finder according to the present invention which has the composition described above is characterized in that it satisfies the following conditions (1), (2) and (3):

$$0.9 < m < 1.8 \tag{1}$$

$$1.2 < m_R/m < 4.0 \tag{2}$$

$$0.4 < D/f_R < 1.5 \tag{3}$$

DETAILED DESCRIPTION OF THE PREFERRED EMBODIMENTS

The secondary image formation type view finder according to the present invention is composed, in order from the object side, of an objective optical system, a first condenser lens system which is disposed in the vicinity of a primary image formed by the objective optical system, a first mirror for folding an optical axis, a relay lens system for erecting an image, a second condenser lens system which has a reflecting surface for folding the optical axis and an eyepiece optical system, and configured so that an optical axis of the relay lens system is included in a plane which is nearly perpendicular to an optical axis of the objective optical system, and the first mirror is nearly in parallel with a second mirror.

When a view finder which is composed, in order from the object side, of an objective optical system, a first condenser lens system, a relay optical system for erecting an image, a second condenser lens system and an eyepiece optical system, like the view finder according to the present invention, is configured so as to shorten a total length of an optical system by contriving a power distribution in the optical system thereof, spaces for disposing the optical axis folding mirrors are reduced, thereby narrowing freedom for layout. Even when the total length of the optical system is shortened, however, it is possible to fold an optical axis without mutual interference between optical parts or eclipse by disposing the optical axis folding mirrors at locations between a primary imaging point and the relay lens system for erecting an image, locations between the relay lens system for erecting an image and a secondary imaging point or locations in or in the vicinities of a condenser lens system disposed in vicinity of the secondary imaging point. Further, it is possible to minimize a space to be occupied by the view finder as a whole by disposing the relay lens system so that the optical axis of the relay lens system is included in a plane which is nearly perpendicular to the optical axis of the objective optical system.

For the reasons described above, the view finder according to the present invention adopts the composition which has been described above.

In order to configure a view finder which has the composition described above so as to have a short total length, occupy a small space and correct aberrations related to image legibleness, it is desirable to satisfy the following conditions (1), (2) and (3):

$$0.9 < m < 1.8 \quad (1)$$

$$1.2 < m_R/m < 4.0 \quad (2)$$

$$0.4 < D/f_R < 1.5 \quad (3)$$

wherein the reference symbol m represents an absolute value of a magnification of a partial lens system from a primary imaging point of the objective optical system to the secondary imaging point, the reference symbol $m_R$ designates an absolute value of a magnification of the relay lens system for erecting an image, the reference symbol $f_R$ denotes a focal length of the relay lens system for erecting an image and the reference symbol D represents a diagonal length of an effective visual field of the primary image.

The condition (1) mentioned above defines an absolute value of a magnification of the partial lens system from the primary imaging point to the secondary imaging point. A distance as measured from the primary imaging point to the secondary imaging point is determined substantially by a focal length, a location of a principal point and a magnification of a secondary imaging system. The distance from the primary imaging point to the secondary imaging point is short at a magnification of -1× in particular. When a primary image has an effective size which is extremely small as in the view finder according to the present invention, however, the aberrations related to image legibleness can be corrected favorably while lessening a burden imposed on an eyepiece optical system and reducing a number of parts by imparting a slight magnifying function to a secondary imaging system without prolonging a total length of a lens system so remarkably. Further, it is preferable to dispose the second condenser lens system at a location which is a little nearer the primary imaging point than the secondary imaging point. Speaking concretely, by disposing the second mirror and the second condenser lens system so that they are accommodated between the relay lens system for erecting an image and the secondary imaging point, it is possible to lessen a burden on the relay lens system for erecting an image and facilitate to correct the aberrations related to image legibleness even when a smaller number of lens system are used for composing these lens systems.

That is, the condition (1) mentioned above is required for accommodating optical members having effective roles within a limited space while making a total length of the view finder lens system as short as possible.

If the upper limit of 1.8 of the condition (1) is exceeded, each of the optical members can easily be laid, but the distance between the primary imaging point and the secondary imaging point will be remarkably prolonged, and the eyepiece optical system has a prolonged focal length, or a distance as measured from the secondary imaging point to the eyepiece optical system is prolonged, thereby prolonging a total length of the viewfinder optical system.

If the lower limit of 0.9 of the condition (1) is exceeded, the eyepiece optical system can hardly current the aberrations related to image legibleness, it will be obliged to arrange the second condenser lens system and the secondary imaging point in this order from a side of the eyepiece optical system and a burden will be heavier on the relay lens system for erecting an image, thereby making it difficult to correct the aberrations related to image legibleness.

The condition (2) defines a ratio of an absolute value of a magnification of the relay lens system for erecting an image relative to a magnification of the partial lens system from the imaging point of the objective optical system to the secondary imaging point (a secondary imaging system).

For enhancing a magnification of the view finder system, it is necessary to configure a system which is composed of the secondary imaging system and the eyepiece optical system so as to have a focal length at a certain small value. Since a pupil diameter also has a definite value, an NA on a side of incidence of the relay lens system for erecting an image has a definite large value. Accordingly, it is desirable for correcting aberrations in the relay lens system for erecting an image to configure the relay lens system for erecting an image so as to have a magnification as high as possible as defined by the condition (2), whereby a total system including the condenser lens system has a magnification within the range defined by the condition (1).

If the lower limit of 1.2 of the condition (2) is exceeded, it will be difficult to correct the aberrations related to image legibleness in the relay lens system. If the upper limit of 4.0 of the condition (2) is exceeded, in contrast, it will be difficult to dispose the first mirror between the first condenser lens system and the relay lens system.

The condition (3) is related to adequate setting of a focal length of the relay lens system. A total length of the viewfinder system is determined by a focal length, a location of a principal point and a magnification of the secondary imaging system. It is extremely effective to shorten a focal length of the relay lens system. When a focal length of the relay lens system is shortened, however, a collective field angle required for the relay lens system itself is enlarged in relation to an effective size of the primary image, thereby not only making it difficult to correct offaxial aberrations but also making it impossible to coincide an optimum location of an exit pupil of the objective optical system with a location of a entrance pupil of the view finder system. Though the locations of these pupils adjustable by strengthening a power of the condenser lens systems, they can be adjusted only within certain limits.

If the upper limit of 1.5 of the condition (3) is exceeded, it will be difficult to correct offaxial aberrations related to image legibleness and marginal portions of an image will tend to be eclipsed. On the other hand, a larger total thickness $\Sigma d$ of the relay system is more advantageous for correction of the offaxial aberrations. It will therefore be difficult to correct coma, astigmatism, etc. if the lower limit of 0.4 of the condition (3) is exceeded.

For further shortening a total length, reducing a space to be occupied and correcting the aberrations related to image legibleness, it is desirable to satisfy, in place of the conditions (1), (2) and (3), the following conditions (1-1), (2-1) and (3-1):

$$1.0<m<1.5 \quad (1\text{-}1)$$

$$1.2<m_R/m<3.0 \quad (2\text{-}1)$$

$$0.5<D/f_R<1.1 \quad (3\text{-}1)$$

Further, it is more desirable to satisfy, in place of the conditions (1), (2) and (3) or the conditions (1-1), (2-1) and (3-1), the following conditions (1-2), (2-2) and (3-2):

$$1.1<m<1.35 \quad (1\text{-}2)$$

$$1.3<m_R/m<2.0 \quad (2\text{-}2)$$

$$0.6<D/f_R<0.8 \quad (3\text{-}2)$$

A space to be occupied by the view finder system as a whole after the optical axis is folded can further be reduced when a folding angle of the optical axis formed by the first mirror, i.e., an angle $\theta$ formed between a ray incident on the mirror and a ray reflected by the mirror, satisfies the condition (4) shown below and the second mirror is disposed in parallel with the first mirror:

$$50°<\theta<120° \quad (4)$$

If the upper limit of the condition (4) is exceeded, the effect to reduce the space to be occupied by the view finder system will be insufficient. If the lower limit of the condition (4) is exceeded, interference between the optical parts and eclipse will undesirably tend to occur.

Further, it is desirable to satisfy, in place of the condition (4), the following condition (4-1):

$$55°<\theta<100° \quad (4\text{-}1)$$

Furthermore, it is desirable to satisfy, in place of the condition (4) or (4-1), the following condition (4-2):

$$60°<\theta<80°$$

The space to be occupied by the view finder system can be reduced by shortening the total length of the optical system and skillfully folding an optical path as described above. It is effective for reducing the space to be occupied by the view finder system to reduce a number of optical parts. Reduction of the optical parts is effective also for lowering a manufacturing cost.

In the view finder system according to the present invention, the relay lens system for erecting an image is composed only of three lens elements. When the total length of the optical system is shortened and the lens system which composes an imaging system is composed of the three lens elements, it is extremely difficult to correct the aberrations related to image legibleness. The relay lens system of the view finder system according to the present invention is composed, in order from the object side, of a first biconvex lens element which has an object side surface having curvature higher than that of an image side, a second biconcave lens element and a third biconvex lens element which has an eye point side surface having high curvature, and configured so as to satisfy the following conditions (5) and (6):

$$0<\{(n_{R1}+n_{R3})/2\}-n_{R2} \quad (5)$$

$$0.7<\Sigma d/f_R<3.0 \quad (6)$$

wherein the reference symbols $n_{R1}$, $n_{R2}$ and $n_{R3}$ represent refractive indices of the first, second and third lens elements respectively, the reference symbol $\Sigma d$ designates a total thickness of the relay lens system and the reference symbol $f_R$ denotes a focal length of the relay lens system.

The condition (5) defines relationship among refractive indices of medium of the lens elements which compose the relay lens system.

When a total length of a secondary image formation type view finder is shortened, refractive powers of condenser lens systems and a relay lens system are strengthened, thereby remarkably enlarging a Petzval's sum. In order to correct a Petzval's sum, on the other hand, at least a negative lens element must exist in a lens system. The relay lens system of the view finder system according to the present invention comprises a negative lens element.

If the lower limit of the condition (5) is exceeded, it will be impossible to correct a Petzval's sum sufficiently, thereby tending to allow diopter to deviate toward a longer distance at a marginal portion of a screen than that at a central portion. An upper limit of the condition (5) can be enlarged limitlessly within a range of glass materials which are currently available. For correcting longitudinal chromatic aberration, however, it is necessary that positive lens elements have large Abbe's numbers and negative lens has a small Abbe's number. Lateral chromatic aberration is not produced substantially in the optical system which is symmetrical. Though it is difficult to combine lens elements as described above, a refractive index difference is considered preferentially for the view finder system according to the present invention and chromatic aberration can be corrected using a refractive optical surface.

The condition (6) defines a total thickness of the relay lens system. When a focal length of the relay lens system is shortened, the relay lens itself has a large field angle, thereby making it difficult to correct offaxial aberration. In order to make correction of axial aberrations compatible with correction of offaxial aberrations, it is desirable to dispose surfaces of the lens elements which compose the relay lens system.

If the lower limit of 0.7 of the condition (6) is exceeded, it will be difficult to correct coma and astigmatism. If the upper limit of 3.0 of the condition (6) is exceeded, in contrast, it will be difficult to reserve a power required for the relay lens system itself.

It is more desirable to satisfy, in place of the conditions (5) and (6), the following conditions (5-1) and (6-1) respectively:

$$0.04 < \{(n_{R1}+n_{R3})/2\}-n_{R2} \quad (5\text{-}1)$$

$$0.75 < \Sigma d/f_R < 1.8 \quad (6\text{-}1)$$

Further, it is most desirable to satisfy the following conditions (5-2) and (6-2).

$$0.08 < \{(n_{R1}+n_{R3})/2\}-n_{R2} \quad (5\text{-}2)$$

$$0.8 < \Sigma d/f_R < 1.2 \quad (6\text{-}2)$$

It is possible to reduce a number of parts, thereby lowering a manufacturing cost by composing the second condenser lens system which comprises the reflecting surface described above of a prism having a surface of incidence which has a refractive power and a reflecting surface which is used to fold the optical axis.

Further, it is desirable for lessening the burden on the relay lens system that the relay lens system satisfies the following condition (7):

$$0 < |R_{EN}/R_{EX}| < 0.9 \quad (7)$$

wherein the reference symbols $R_{EN}$ and $R_{EX}$ represent radii of curvature on the surface of incidence and a surface of emergence of the prism.

If the lower limit of 0 of the condition (7) is exceeded, an advantage for correction of aberrations will be obtained but the surface of incidence will have too high curvature which makes it impossible to compose a prism. If the upper limit of 0.9 of the condition (7) is exceeded, in contrast, it will be impossible to lessen the burden on the relay lens system.

It is desirable to compose a mirror for splitting an optical path to an image pickup optical system and a view finder optical system so as to have a view finder which is disposed on a transmission side and a reflecting surface for folding the optical axis which is disposed between the optical path splitting mirror and a lens element disposed in the vicinity of an imaging point of the image pickup optical system. Further, it is preferable to dispose the mirror for splitting the optical path the image pickup optical system and the view finder optical system so that it is folded in a plane which includes a normal to the mirror and an optical axis of the image pickup optical system.

It is more desirable to satisfy, in place of the condition (7) mentioned above, the following condition (7-1):

$$0.1 < |R_{EN}/R_{EX}| < 0.7 \quad (7\text{-}1)$$

Further, it is most desirable to satisfy the following condition (7-2):

$$0.2 < |R_{EN}/R_{EX}| < 0.6 \quad (7\text{-}2)$$

The view finder according to the present invention described above is applicable not only as a single-lens reflex type view finder for digital cameras which use image pickup optical systems having extremely short focal lengths but also as a view finder other than TTL for observation optical systems for endoscopes, microscopes, telescopes and binoculars.

When a second half mirror is disposed in an optical path for directing rays emerging from the objective optical system so as to pass through the first half mirror toward the view finder optical system, it is possible to carry out TTL light measurement by leading rays having passed through the second half mirror to a light measurement system.

A TTL light measurement system of the view finder according to the present invention is characterized in that it comprises a first half mirror which reflects a portion of an incident light bundle to lead it to an image pickup system and transmits the rest portion to lead it to a view finder optical system, and a second half mirror which is disposed in the view finder optical system and leads rays led to the view finder optical system to the light measurement system, and that an angle ϕ formed between a surface of incidence of the first half mirror and a surface of incidence of the second half mirror satisfies the following condition (11):

$$60° < \phi < 120° \quad (11)$$

When the first and second half mirrors are disposed so as to satisfy the condition (11) in the optical system according to the present invention, an intensity of light which reaches the image pickup system is nearly equal to an intensity of light which reaches the light measurement system, thereby making it possible to carry out TTL measurements with a high accuracy even a degree of polarization is changed from object to object.

It is desirable that the optical system (light measurement system) according to the present invention satisfies the following condition (12):

$$|\theta_1-\theta_2| < 40° \quad (12)$$

wherein the reference symbol $\theta_1$ represents an angle formed between a normal to a surface of the first half mirror and an incident light bundle, and the reference symbol $\theta_2$ designates an angle formed between a normal to a surface of the second half mirror and an incident light bundle.

When the condition (12) is satisfied, the optical system according to the present invention is capable of suppressing to a low level a difference between a polarized degree of rays reflected by the first half mirror and a polarized degree of rays reflected by the second half mirror.

If the upper limit of 40° of the condition (12) is exceeded, the polarized degrees are largely different, thereby making it impossible to carry out light measurement with a high accuracy.

The view finder optical system according to the present invention comprises the relay lens system which erects an intermediate image (primary image) and it is desirable to set a distance D(H) as measured from an object side surface of the relay lens system to the second half mirror so as to satisfy the following condition (13):

$$0.2L < D(H) < L \quad (13)$$

wherein the reference symbol L represents a size of the intermediate image.

For reducing influences due to changes of polarized degrees in TTL light measurements by the view finder according to the present invention to enable light measurements with a higher accuracy, it is desirable to satisfy, in place of the condition (11), the following condition (11-1):

$$70° < \phi < 110° \quad (11\text{-}1)$$

When it is required to carry out light measurements with an accuracy which is high in particular, it is desirable to satisfy, in place of the condition (11), the following condition (11-2) or (11-3):

$$80° < \phi < 100° \quad (11\text{-}2)$$

$$85° < \phi < 95° \quad (11\text{-}3)$$

In order to enhance an accuracy for TTL light measurements with the view finder according to the present intention, it is desirable to satisfy, in place of the condition (12), the following condition (12-1):

$$|\theta_1 - \theta_2| < 30° \quad (12\text{-}1)$$

When it is required to carry out light measurements with an accuracy which is high in particular, it is desirable to satisfy in place of the condition (12) or condition (12-1), the following condition (12-2):

$$|\theta_1 - \theta_2| < 20° \quad (12\text{-}2)$$

To carry out TTL light measurements with a high accuracy, it is similarly desirable to satisfy in place of the condition (13), the following condition (13-1):

$$0.3L < D(H) < 0.9L \quad (13\text{-}1)$$

To carry out light measurements with an accuracy which is high in particular, it is desirable to satisfy, in place of the condition (13-1), the following condition (13-2):

$$0.4L < D(H) < 0.8L \quad (13\text{-}2)$$

The view finder according to the present invention is illustrated in FIGS. 1 through 4, wherein an optical system is shown dividedly.

Figure 1:
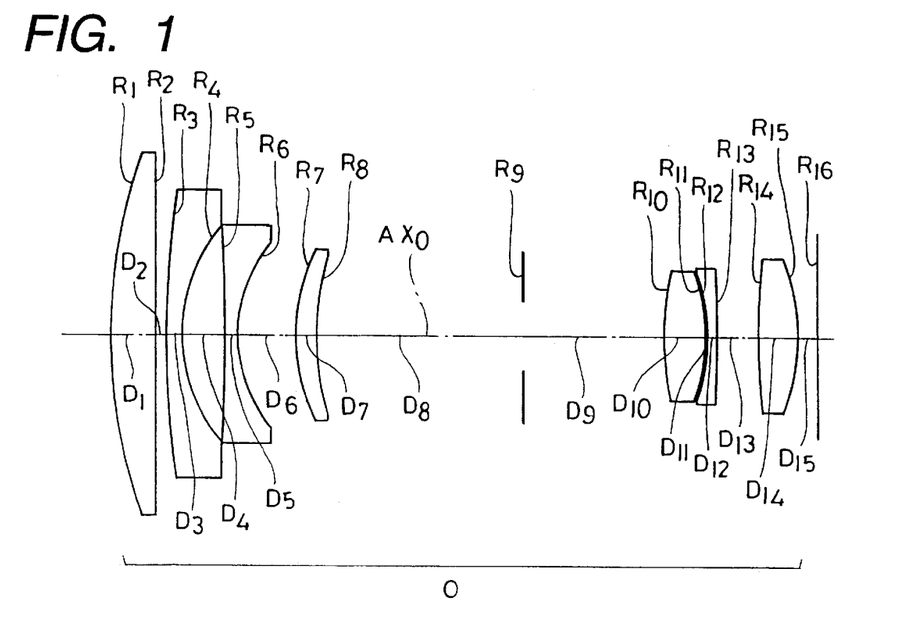
FIG. 1 shows a sectional view illustrating an objective optical system which uses the view finder according to the present invention.
Figure 2:
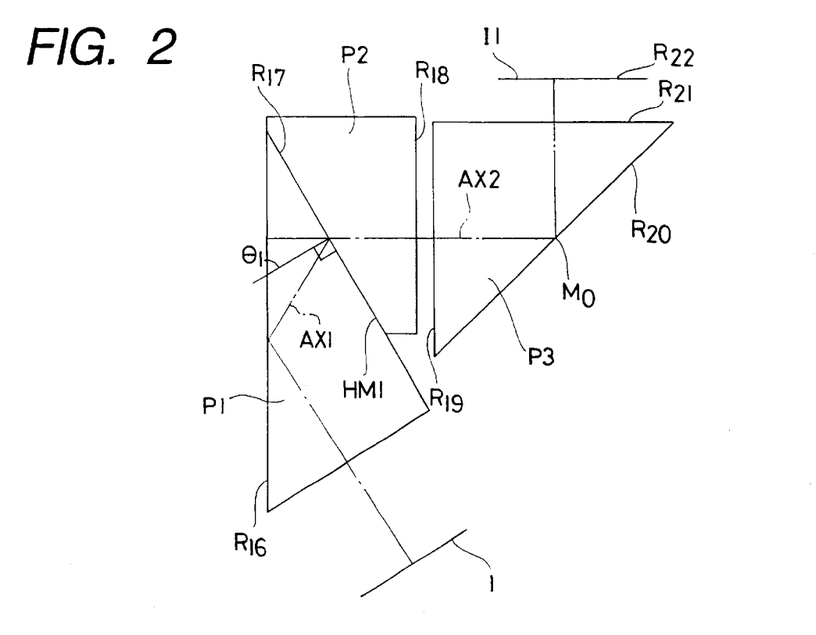
FIG. 2 shows a sectional view illustrating a prism system which is to be used in the view finder according to the present invention.

FIG. 1 shows an objective optical system and FIG. 2 shows a prism system for splitting an optical path from the objective optical system to a view finder optical system. In these drawings, a reference symbol O represents the objective optical system, a reference symbol HMI designates a half mirror which splits an optical path from the objective optical system to an image pickup system and a view finder system, and a reference symbol I1 denotes a primary image formed by the objective optical system.

Figure 3:
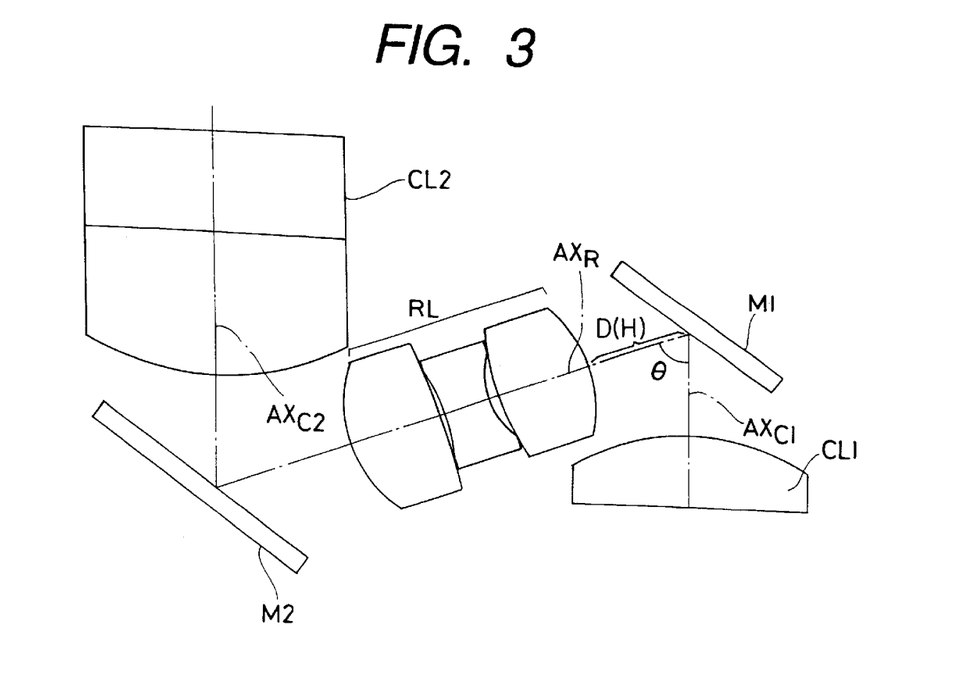
FIG. 3 shows a sectional view illustrating a composition of a lens system from a first condenser lens system to a second condenser lens system of the view finder according to the present invention.

FIG. 3 shows an optical system from the primary imaging surface to a vicinity of a secondary imaging surface. Shown in FIG. 3 is a sectional view taken along a plane perpendicular to an optical axis $AX_0$ which is located on the paper in FIG. 1.

In FIG. 3, a reference symbol CL1 represents a first condenser lens system which is disposed in the vicinity of the primary imaging surface, a reference symbol M1 designates a first mirror for folding an optical axis $AX_{C1}$ of the first condenser lens system CL1, a reference symbol R1 denotes a relay lens system for erecting an image, a reference symbol M2 represents a second mirror for folding an optical axis $AX_R$ of the relay lens system RL and a reference symbol CL2 designates a second condenser lens system which comprises a reflecting surface M3 for folding an optical axis $AX_{C2}$ thereof.

Figure 4:
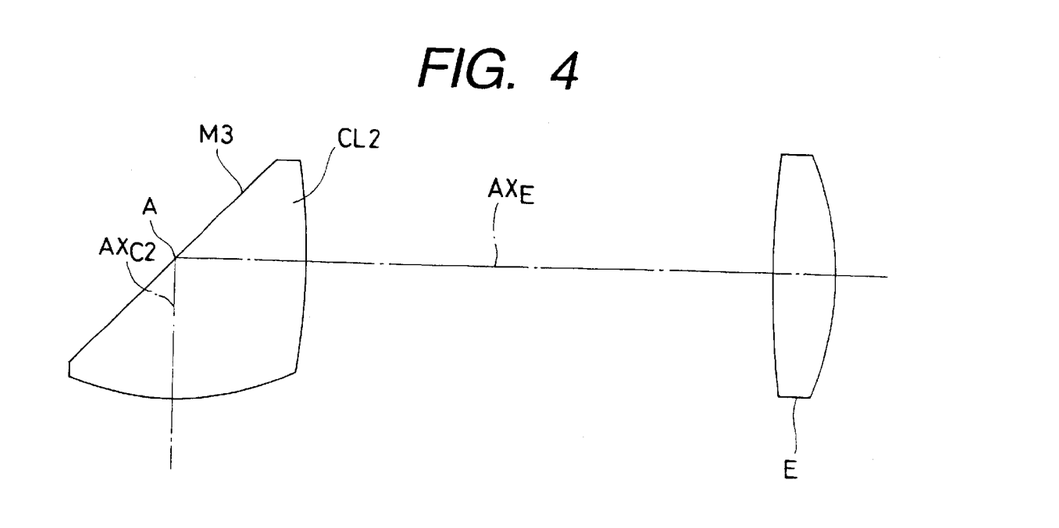
FIG. 4 shows a sectional view illustrating a composition of a lens system from a second condenser lens system to an eyepiece optical system of the view finder according to the present invention.

FIG. 4 shows an optical system from the second condenser lens system CL2 to an eyepiece optical system E, or a sectional view taken along a plane which is substantially in parallel with the optical axis $AX_0$ of the objective optical system.

As shown in these drawings, the secondary image formation type view finder according to the present invention splits rays from the objective optical system O shown in FIG. 1 into the image pickup system and view finder system with a half mirror HM1 disposed in them prism system shown in FIG. 2, and folds upward in the drawing rays which travel to the finder system. The folded rays are used to form the primary image I1.

In the view finder according to the present invention which is illustrated in FIGS. 1 through 4, the prism system which splits rays which are emitted from an object and emerge from the objective optical system O is composed of a prism P1, a prism P2 and the half mirror HM1. Rays from the objective optical system (photographic optical system) O are incident on a surface $R_{16}$ of the prism P1. A portion of the rays are reflected by the half mirror HM1 (SURFACE $R_{17}$), further reflected totally by the surface $R_{16}$ of the prism P1 and travel toward the photographic system (image pickup surface 1), whereas the rest portion of the rays transmit through the half mirror HM1 (surface $R_{17}$), emerge from a surface $R_{18}$ of the prism P2, thereafter being incident on a surface $R_{19}$ of a prism P3, reflected by a reflecting surface M0 (surface $R_{20}$), emerging from a surface $R_{21}$ of the prism P3 and travelling to the view finder system.

As shown in FIG. 3, the rays travelling to the view finder system pass through the first condenser lens system CL1 disposed in the vicinity of the primary image $I_1$, are reflected and folded back by the first mirror M1, further pass through the relay lens system RL for erecting an image, and reflected and folded once again by the second mirror M2. That is, the optical axis $AX_{C1}$ of the first condenser lens system CL1 is folded by the first mirror M1 and then the optical axis $AX_R$ of the relay lens system RL is folded by the second mirror M2.

FIG. 3 shows the sectional view taken along the plane which is perpendicular to the optical axis $AX_0$ of the objective optical system O as described above. As apparent from FIG. 3, the optical axis $AX_R$ of the relay lens system RL is located in a plane which is perpendicular to the optical axis $AX_0$ of the objective optical system O.

Further, the rays which are reflected by the second mirror M2 are incident on the second condenser lens system CL2, reflected and deflected by the reflecting surface M3 disposed in the second condenser lens system CL2, and emerge from the second condenser lens system CL2. That is, the optical axis $AX_{C2}$ of the second condenser lens system is deflected in the lens system CL2 as shown in FIG. 4.

FIG. 4 shows the sectional view taken along the plane which is substantially in parallel with the optical axis $AX_0$ of the objective optical system O as described above, whereby an optical axis $AX_E$ of the eyepiece optical system E is directed substantially in parallel with the optical axis $AX_0$ of the objective optical system O in this sectional view. That is, the optical axis $AX_{C2}$ of the second condenser lens system CL2 which is along the plane perpendicular to the optical axis $AX_0$ of the objective optical system O is folded nearly at a right angle in the lens system, travels in a plane in parallel with the optical axis $AX_O$ of the objective optical system O, emerges from the second condenser lens system CL2 and passes through the eyepiece optical system E.

The secondary image formation type view finder according to the present invention is configured so that rays which have passed through the objective optical system and are split from rays which are to be led to the photographic system are deflected once in a direction perpendicular to the optical axis (light travelling direction) of the objective optical system and further deflected in the second condenser lens system so as to travel in a direction in parallel with the optical path of the objective optical system (light travelling direction in the objective optical system).

FIGS. 5 through 8 show sectional views illustrating embodiments of the view finder according to the present invention, each of which ranges from a first condenser lens system to an eyepiece optical system. Each of these sectional views illustrates optical elements (lens elements, reflecting mirrors, etc.) arranged along a straight optical axis while disregarding folding of the optical axis on each reflecting surface.

The lens systems preferred as the embodiments shown in FIGS. 5 through 8 have numerical data which is listed below:

Embodiment 1

$r_1 = \infty$
  $d_1 = 3.7000$    $n_1 = 1.49241$    $\nu_1 = 57.66$
$r_2 = -11.9640$
  $d_2 = 5.6000$
$r_3 = \infty$
  $d_3 = 5.6000$
$r_4 = 6.5440$
  $d_4 = 5.1000$    $n_2 = 1.69680$    $\nu_2 = 55.53$
$r_5 = -13.5630$
  $d_5 = 0.5600$
$r_6 = -3.9680$
  $d_6 = 2.5000$    $n_3 = 1.59270$    $\nu_3 = 35.30$
$r_7 = 10.1720$
  $d_7 = 0.2700$
$r_8 = 44.4860$
  $d_8 = 5.0000$    $n_4 = 1.69680$    $\nu_4 = 55.53$
$r_9 = -6.5850$
  $d_9 = 7.7000$
$r_{10} = \infty$
  $d_{10} = 6.0000$
$r_{11} = 15.2230$
  $d_{11} = 7.5000$    $n_5 = 1.52540$    $\nu_5 = 56.25$
$r_{12} = \infty$
  $d_{12} = 7.1300$    $n_6 = 1.52540$    $\nu_6 = 56.25$
$r_{13} = -35.5100$
  $d_{13} = 25.2225$
$r_{14} = 57.2540$
  $d_{14} = 3.5000$    $n_7 = 1.49241$    $\nu_7 = 57.66$
$r_{15} = -17.4240$ (aspherical surface)
aspherical surface coefficients
$K = 0$,  $A_4 = 4.3541 \times 10^{-5}$, $A_6 = -2.7163 \times 10^{-6}$
  $A_8 = 2.7540 \times 10^{-8}$, $A_{10} = 0$
$m = 1.2510$, $m_R/m = 1.3643$, $D/f_{R\ =\ 0.7800,\ \theta\ =\ 70°}$
$\{(n_{R1} + n_{R3})/2\} - n_{R2} = 0.1041$, $\Sigma d/f_R = 1.0024$
$R_{EN}/R_{EX} = -0.4287$, $\phi = 90°$, $|\theta_1 - \theta_2| = 5°$,
$D(H) = 5.6$, $L = 10.45$ Embodiment 2

$r_1 = \infty$
  $d_1 = 3.7000$    $n_1 = 1.49241$    $\nu_1 = 57.66$
$r_2 = -11.9640$
  $d_2 = 7.0000$
$r_3 = \infty$
  $d_3 = 5.6000$
$r_4 = 6.5440$
  $d_4 = 5.1000$    $n_2 = 1.69680$    $\nu_2 = 55.53$
$r_5 = -13.1170$
  $d_5 = 0.5800$
$r_6 = -4.1810$
  $d_6 = 2.0000$    $n_3 = 1.59270$    $\nu_3 = 35.30$
$r_7 = 10.1040$
  $d_7 = 0.4700$
$r_8 = -38.9870$
  $d_8 = 5.0000$    $n_4 = 1.69680$    $\nu_4 = 55.53$
$r_9 = -6.4000$
  $d_9 = 7.7000$
$r_{10} = \infty$
  $d_{10} = 6.0000$ -continued Embodiment 2

$r_{11} = 14.9320$
  $d_{11} = 8.3000$    $n_5 = 1.52540$    $\nu_5 = 56.25$
$r_{12} = \infty$
  $d_{12} = 6.3300$    $n_6 = 1.52540$    $\nu_6 = 56.25$
$r_{13} = -43.9540$
  $d_{13} = 26.5866$
$r_{14} = 39.5680$
  $d_{14} = 3.8000$    $n_7 = 1.49241$    $\nu_7 = 57.66$
$r_{15} = -18.6120$ (aspherical surface)
aspherical surface coefficients
$K = 0$,  $A_4 = 3.5419 \times 10^{-5}$, $A_6 = -2.2064 \times 10^{-6}$
  $A_8 = 2.6934 \times 10^{-8}$, $A_{10} = 0$
$m = 1.1969$, $m_R/m = 1.6530$, $D/f_{R\ -\ 0.7101,\ \theta\ -\ 70°}$
$\{(n_{R1} + n_{R3})/2\} - n_{R2} = 0.1041$, $\Sigma d/f_R = 0.8936$
$R_{EN}/R_{EX} = -0.3397$, $\phi = 90°$, $|\theta_1 - \theta_2| = 5°$,
$D(H) = 5.6$, $L = 10.45$ Embodiment 3

$r_1 = 36.3400$
  $d_1 = 4.3000$    $n_1 = 1.49241$    $\nu_1 = 57.66$
$r_2 = -12.7020$
  $d_2 = 3.4000$
$r_3 = \infty$
  $d_3 = 6.9000$
$r_4 = 8.3570$
  $d_4 = 5.1000$    $n_2 = 1.69680$    $\nu_2 = 55.53$
$r_5 = -12.9180$
  $d_5 = 0.5800$
$r_6 = -4.4000$
  $d_6 = 2.0000$    $n_3 = 1.59270$    $\nu_3 = 35.30$
$r_7 = 11.5910$
  $d_7 = 0.4700$
$r_8 = \infty$
  $d_8 = 5.0000$    $n_4 = 1.69680$    $\nu_4 = 55.53$
$r_9 = -6.9260$
  $d_9 = 6.7200$
$r_{10} = \infty$
  $d_{10} = 6.9800$
$r_{11} = 14.9800$
  $d_{11} = 7.9800$    $n_5 = 1.52540$    $\nu_5 = 56.25$
$r_{12} = \infty$
  $d_{12} = 6.9500$    $n_6 = 1.52540$    $\nu_6 = 56.25$
$r_{13} = -32.7160$
  $d_{13} = 26.6888$
$r_{14} = 29.4780$
  $d_{14} = 3.8000$    $n_7 = 1.49241$    $\nu_7 = 57.66$
$r_{15} = -21.7820$ (aspherical surface)
aspherical surface coefficients
$K = 0$,  $A_4 = -8.8103 \times 10^{-7}$, $A_6 = -1.2399 \times 10^{-6}$
  $A_8 = 1.5262 \times 10^{-8}$, $A_{10} = 0$
$m = 1.1851$, $m_R/m = 1.4497$, $D/f_{R\ =\ 0.6692,\ \theta\ =\ 70°}$
$\{(n_{R1} + n_{R3})/2\} - n_{R2} = 0.1041$, $\Sigma d/f_R = 0.8421$
$R_{EN}/R_{EX} = -0.4579$, $\phi = 90°$, $|\theta_1 - \theta_2| = 5°$,
$D(H) = 5.6$, $L = 10.45$ Embodiment 4

$r_1 = 14.3860$
  $d_1 = 4.0000$    $n_1 = 1.49241$    $\nu_1 = 57.66$
$r_2 = -41.7720$ (aspherical surface)
  $d_2 = 5.7000$
$r_3 = \infty$
  $d_3 = 6.9000$
$r_4 = 6.2500$
  $d_4 = 5.1000$    $n_2 = 1.69680$    $\nu_2 = 55.53$
$r_5 = -34.3270$
  $d_5 = 0.7100$ -continued

Embodiment 4

| | | |
|---|---|---|
| $r_6 = -4.7270$ | | |
| $d_6 = 2.1100$ | $n_3 = 1.59270$ | $v_3 = 35.31$ |
| $r_7 = 8.1120$ | | |
| $d_7 = 0.2300$ | | |
| $r_8 = 14.3530$ | | |
| $d_8 = 5.0000$ | $n_4 = 1.69680$ | $v_4 = 55.53$ |
| $r_9 = -8.4400$ | | |
| $d_9 = 6.7200$ | | |
| $r_{10} = \infty$ | | |
| $d_{10} = 6.9800$ | | |
| $r_{11} = 15.3450$ | | |
| $d_{11} = 8.3000$ | $n_5 = 1.52540$ | $v_5 = 56.25$ |
| $r_{12} = \infty$ | | |
| $d_{12} = 6.6500$ | $n_6 = 1.52540$ | $v_6 = 56.25$ |
| $r_{13} = -30.0820$ | | |
| $d_{13} = 27.9892$ | | |
| $r_{14} = 27.7180$ | | |
| $d_{14} = 3.5000$ | $n_7 = 1.49241$ | $v_7 = 57.66$ |
| $r_{15} = -24.7980$ (aspherical surface) | | | aspherical surface coefficients
(2nd surface) $K = 0$,  $A_4 = -1.5000 \times 10^{-4}$,
  $A_6 = 1.2000 \times 10^{-6}$
  $A_8 = 0, A_{10} = 0$
(15th surface) $K = 0$,  $A_4 = 5.6726 \times 10^{-5}$,
  $A_6 = -2.6809 \times 10^{-6}$
  $A_8 = 3.4328 \times 10^{-8}, A_{10} = 0$
$m = 1.2324$, $m_R/m = 1.8076$, $D/f_{R = 0.7512, \theta = 70°}$
$\{(n_{R1} + n_{R3})/2\} - n_{R2} = 0.1041$, $\Sigma d/f_R = 0.9453$
$R_{EN}/R_{EX} = -0.5101$, $\phi = 90°$, $|\theta_1 - \theta_2| = 5°$,
$D(H) = 5.6$, $L = 10.45$ wherein the reference symbols $r_1$, $r_2$, . . . represent radii of curvature on respective lens elements, the reference symbols $d_1$, $d_2$, . . . designate thicknesses of the respective lens elements and airspaces reserved therebetween, the reference symbols $n_1$, $n_2$, . . . denote refractive indices of the respective lens elements, and the reference symbols $v_1$, $v_2$, . . . represent Abbe's numbers of the respective lens elements.

Figure 8:
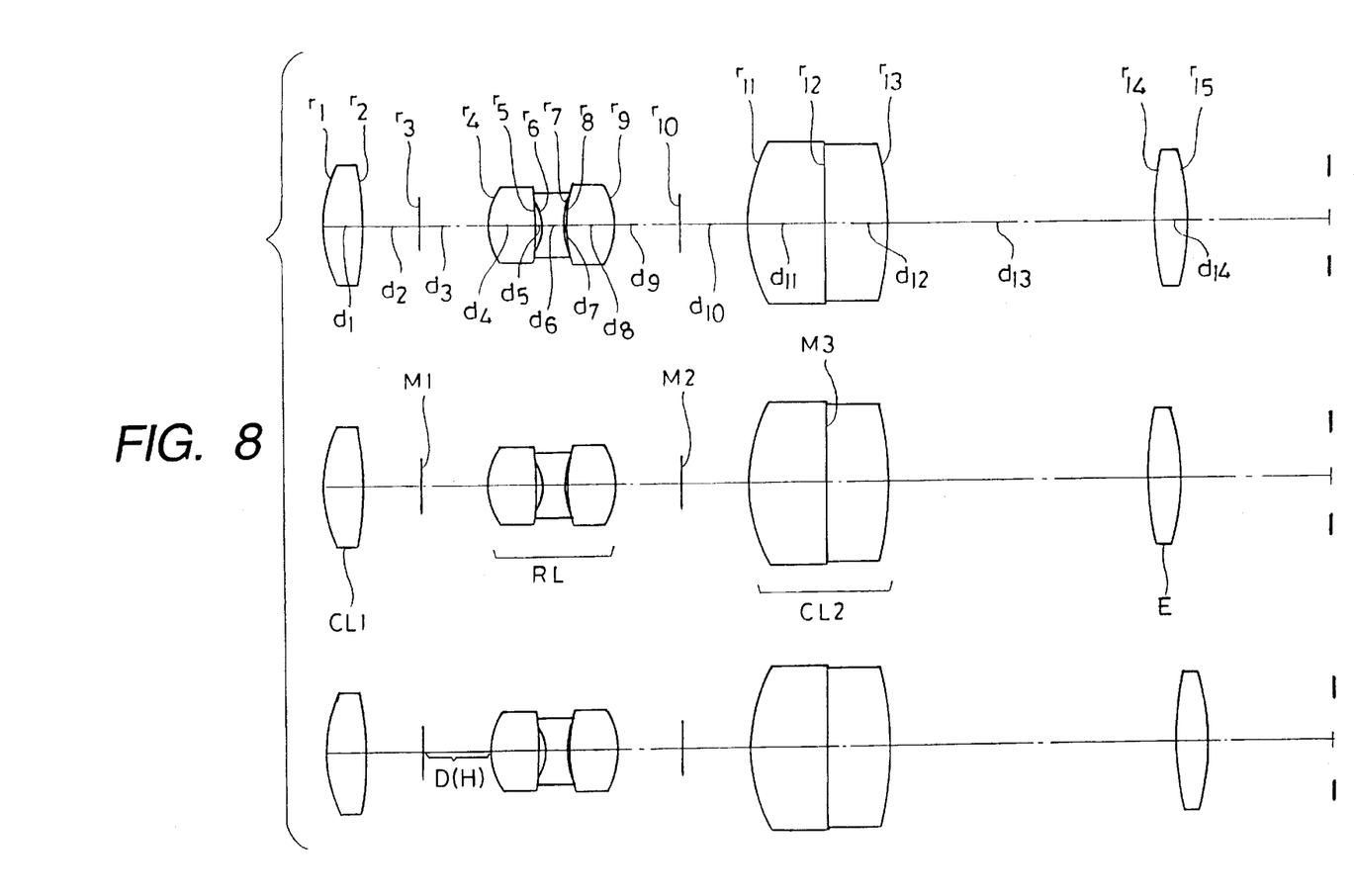

The embodiments of the present invention use a common objective optical system, and have a composition illustrated in FIG. 1 and the numerical data which is listed below:

| | | |
|---|---|---|
| $R_1 = 51.2350$ | | |
| $D_1 = 4.7000$ | $N_1 = 1.69680$ | $V_1 = 55.53$ |
| $R_2 = \infty$ | | |
| $D_2 = 1.0000$ | | |
| $R_3 = 96.1930$ | | |
| $D_3 = 1.8000$ | $N_2 = 1.60311$ | $V_2 = 60.64$ |
| $R_4 = 16.3040$ | | |
| $D_4 = 4.4000$ | | |
| $R_5 = -164.7960$ | | |
| $D_5 = 1.4000$ | $N_3 = 1.51633$ | $V_3 = 64.14$ |
| $R_6 = 14.1320$ | | |
| $D_6 = 6.0200$ | | |
| $R_7 = 19.0230$ | | |
| $D_7 = 0.2000$ | $N_4 = 1.84666$ | $V_4 = 23.78$ |
| $R_8 = 27.7180$ | | |
| $D_8 = 21.8759$ | | |
| $R_9 = \infty$ (stop) | | |
| $D_9 = 14.8250$ | | |
| $R_{10} = 27.6560$ | | |
| $D_{10} = 4.4800$ | $N_5 = 1.72916$ | $V_5 = 54.68$ |
| $R_{11} = -20.5370$ | | |
| $D_{11} = 0.1000$ | | |
| $R_{12} = -18.8270$ | | |
| $D_{12} = 0.9000$ | $N_6 = 1.84666$ | $V_6 = 23.78$ |
| $R_{13} = -168.9160$ | | |
| $D_{13} = 4.5129$ | | |
| $R_{14} = 55.7400$ (aspherical surface) | | |
| $D_{14} = 4.0000$ | $N_7 = 1.56014$ | $V_7 = 60.00$ |
| $R_{15} = -20.3910$ | | |
| $D_{15} = 1.9405$ | | |
| $R_{16} = \infty$ | | |
| $D_{16} = 3.8550$ | $N_8 = 1.51633$ | $V_8 = 64.14$ |
| $R_{17} = \infty$ | | |
| $D_{17} = 4.8550$ | $N_9 = 1.51633$ | $V_9 = 64.14$ |
| $R_{18} = \infty$ | | |
| $D_{18} = 1.0000$ | | |
| $R_{19} = \infty$ | | |
| $D_{19} = 7.0000$ | $N_{10} = 1.52540$ | $V_{10} = 56.25$ |
| $R_{20} = \infty$ | | |
| $D_{20} = 7.0000$ | $N_{11} = 1.52540$ | $V_{11} = 56.25$ |
| $R_{21} = \infty$ | | |
| $D_{21} = 2.9742$ | | |
| $R_{22} = \infty$ (primary imaging surface) | | | aspherical surface coefficients
$K = 0$,  $A_4 = -5.5579 \times 10^{-5}$,
  $A_6 = 2.2107 \times 10^{-7}$, $A_8 = -4.2425 \times 10^{-9}$,
  $A_{10} = 2.7962 \times 10^{-11}$ In the numerical data, the reference symbols $R_1$, $R_2$, . . . represent radii of curvature on respective lens elements of an objective lens system shown in FIG. 8: $R_1$ through $R_{15}$ being radii of curvature on surfaces of a lens system $R_{16}$ through $R_{21}$ being radii of curvature on surfaces of prisms, and $R_{22}$ being a radius of curvature on a primary imaging surface. Similarly, the reference symbols $D_1$, $D_2$, . . . designate thicknesses of the lens elements and airspaces reserved therebetween: $D_{16}$, $D_{17}$, $D_{18}$ and $D_{19}$ being optical paths of the prisms, the reference symbols $N_1$, $N_2$, . . . denote refractive indices of the respective lens elements: $N_8$, $N_9$, $N_{10}$ and $N_{11}$ being refractive indices of the prisms, and $V_1$, $V_2$, . . . represent Abbe's numbers of the lens elements: $V_8$, $V_9$, $V_{10}$ and $V_{11}$ being Abbe's numbers of the prisms.

Figure 5:
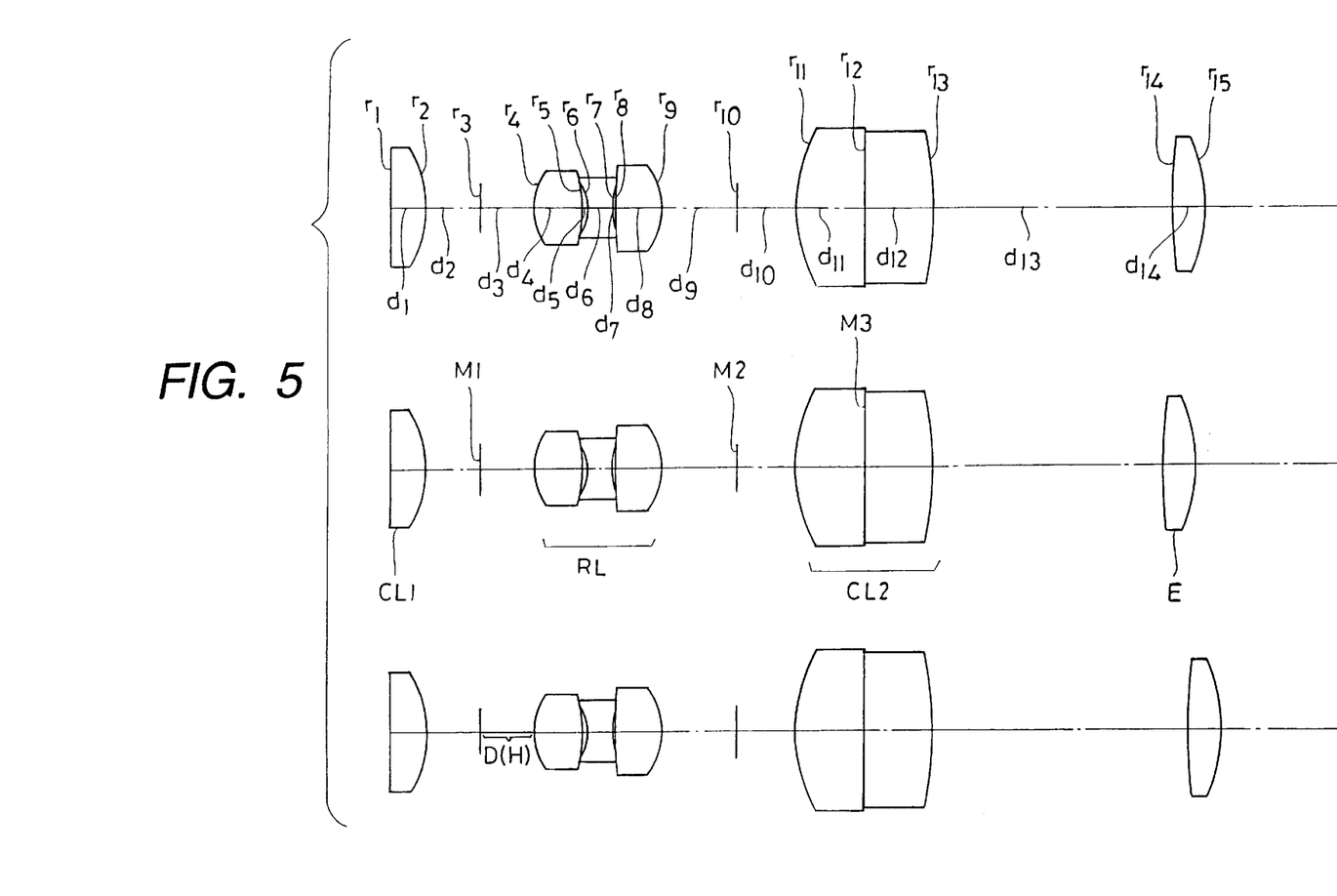
FIGS. 5 through 8 show sectional views illustrating compositions of first through fourth embodiments of the view finder according to the present invention.

The first embodiment is composed, as shown in FIG. 5, of a first condenser lens system ($r_1$ and $r_2$), a first mirror $r_3$, a relay lens system ($r_4$ through $r_9$) which consists of a positive lens element, a negative lens element and a positive lens element, a second mirror $r_{10}$, a second condenser lens system ($r_{11}$ through $r_{13}$) which has a reflecting surface ($r_{12}$) therein, and an eyepiece lens system ($r_{14}$ and $r_{15}$).

Figure 9:
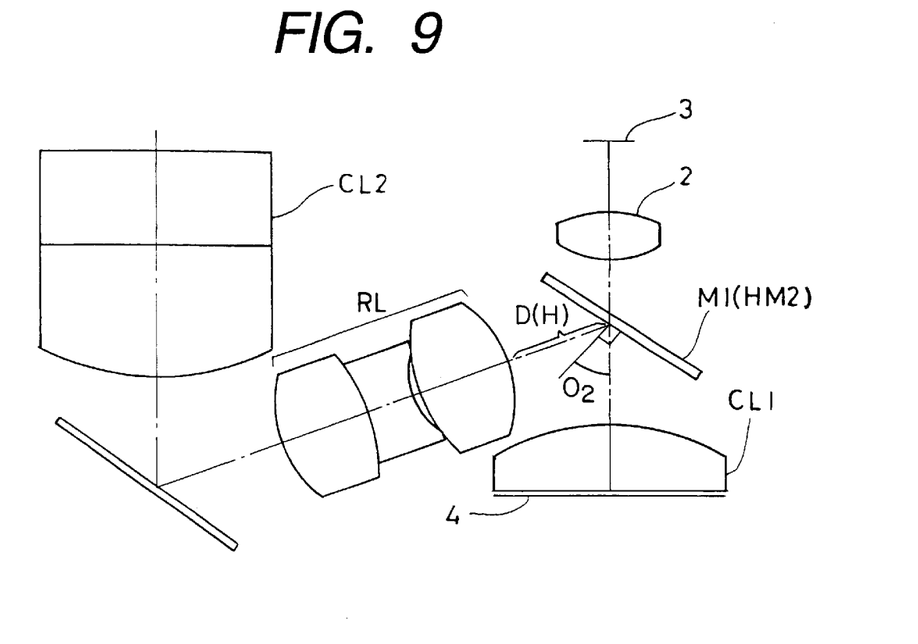
FIG. 9 is a sectional view illustrating a composition of a TTL light measurement device which is to be used in the view finder according to the present invention.

In this finder optical system, rays from the objective lens system are reflected by a reflecting surface M0 so as to be deflected in a direction perpendicular to an optical axis of the objective optical system and then form a primary image $I_1$ as shown in FIG. 9.

In the first embodiment wherein a first condenser lens system CL1 is disposed in the vicinity of the primary image $I_1$, an optical axis is folded at an angle $\theta$ by a first mirror M1 which is disposed between the first condenser lens system CL1 and a relay lens system RL, the optical axis is further folded at the angle $\theta$ by a second mirror M2, the optical axis is bent by a reflecting surface M3 formed in a second condenser lens system CL2 and a secondary image which is to be observed through an eyepiece system E is formed immediately after the second condenser lens system CL2.

The view finder preferred as the first embodiment of the present invention satisfies the conditions (1) through (7).

Figure 6:
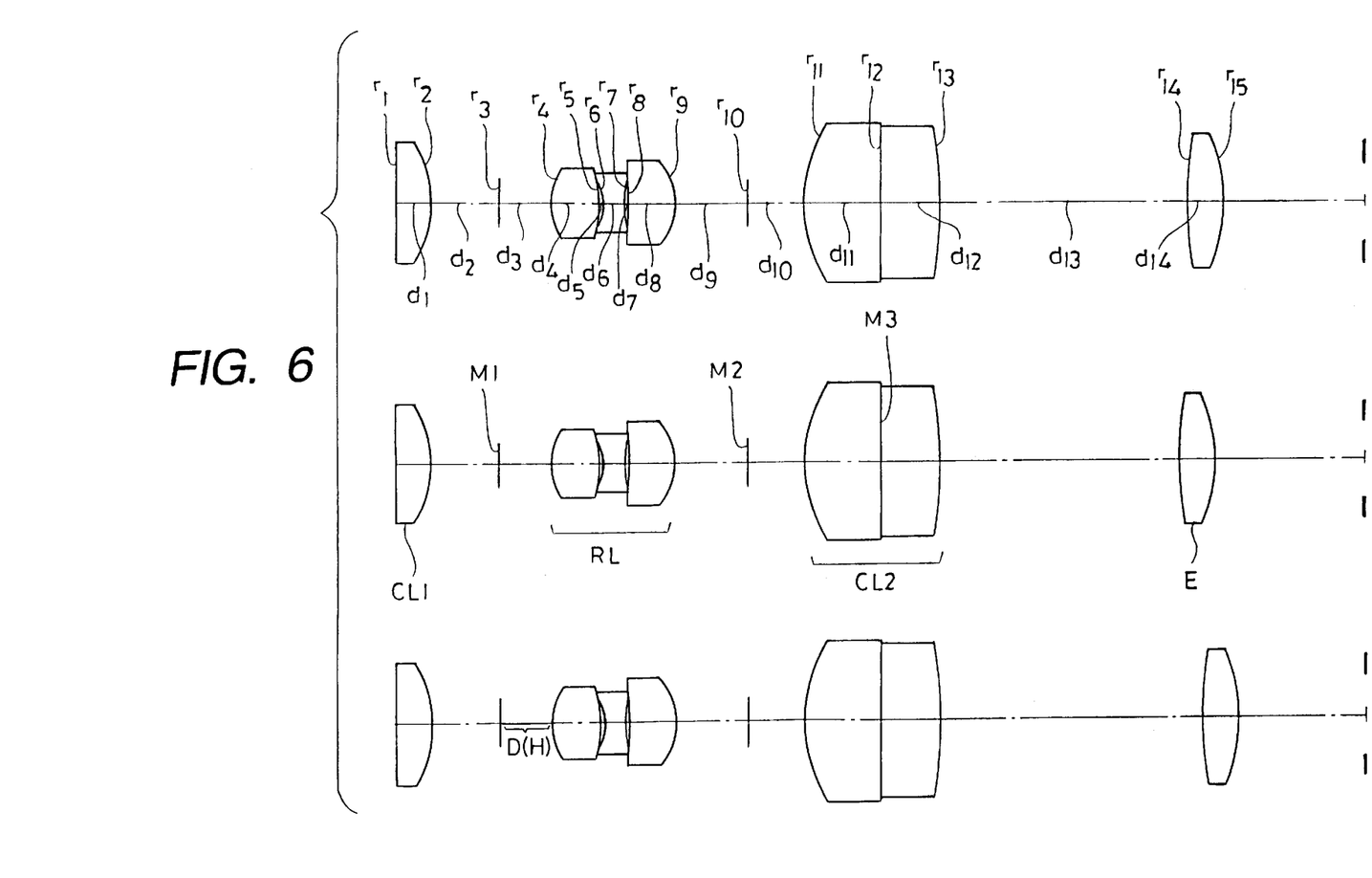
Figure 7:
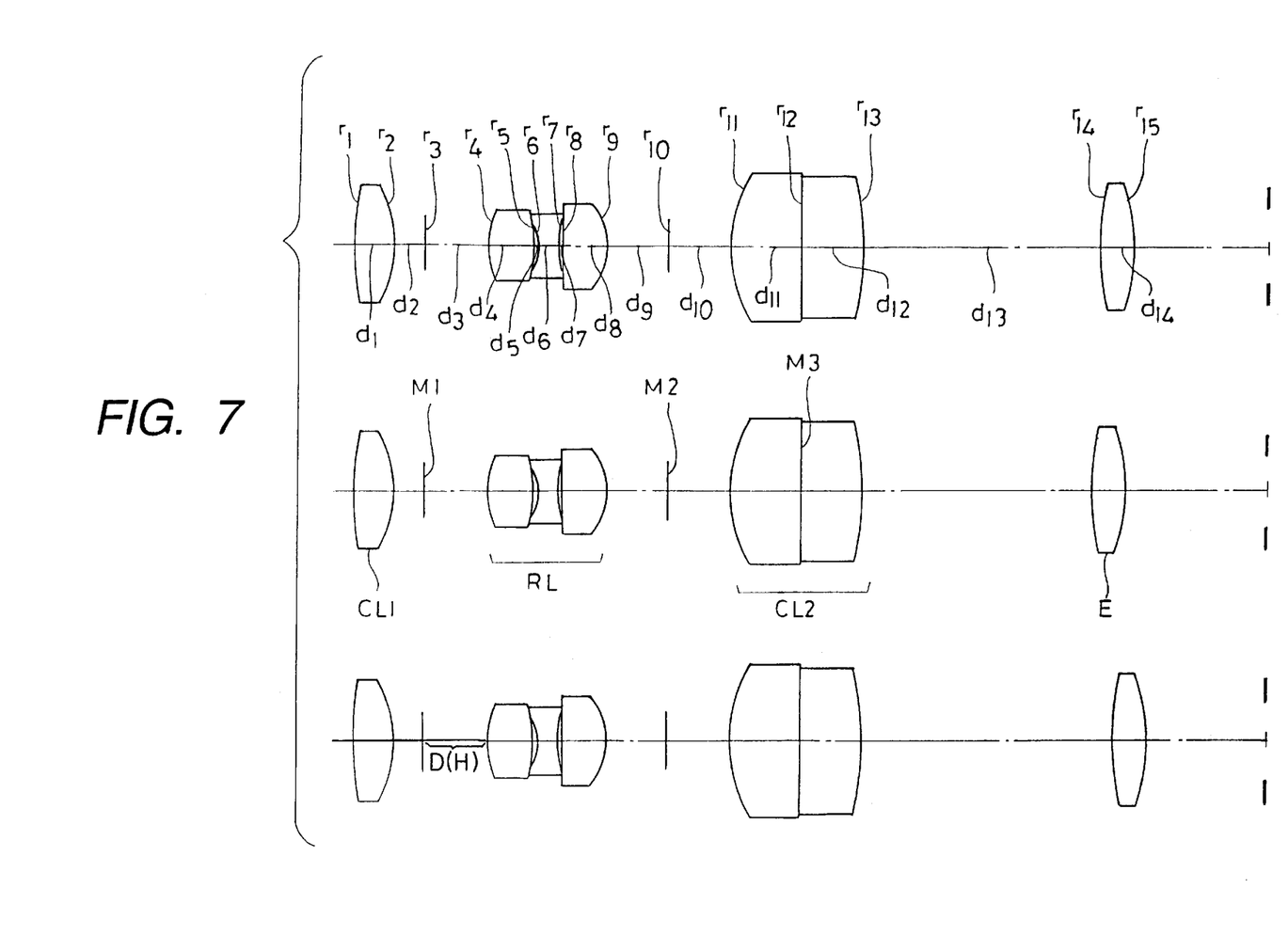

Further, the second through fourth embodiments of the present invention have compositions illustrated in FIGS. 6 through 8 which are similar to that of the first embodiment and satisfy each of the conditions.

Aspherical surfaces which are used in the embodiments described above and objective optical systems have shapes expressed by the following formula:

$$x = (y^2/r)/[1 + \{1 - (k+1)(y/r)^2\}^{1/2}] + A_4 y^4 + A_6 y^6 + A_8 y^8 + A_{10} y^{10}$$

wherein an intersection between an optical axis and the surface of interest is taken as the origin, a direction along the optical axis is taken as the x axis, a direction which passes through the origin and is perpendicular to the optical axis is taken as the y axis, the reference symbol r represents a radius of curvature on a reference sphere, the reference symbol k designates conical constant, and the reference symbols $A_4, A_6, \ldots$ denote aspherical coefficients of the fourth, sixth, . . . orders respectively.

Now, description will be made of a TTL view finder light measurement system.

In FIGS. 1 and 2, a first prism P1, a second prism P2 and a first half mirror HM1 are disposed on the image side of an image pickup lens system (objective lens system) O so that rays which are emitted from an object and emerge from the image pickup lens system O are incident on the first prism P1 whereby a portion of the rays are reflected by the first half mirror HM1, totally reflected once in the prism P1 and form an image of the object on an image pickup device 1 such as a CCD. On the other hand, the rest portion of the rays which transmit through the first half mirror HM1 are incident onto a third prism P3, deflected 90° by a totally reflecting surface M0 and form a image of the object at an intermediate imaging location (first imaging point) $I_1$.

A surface of incidence of the first half mirror HMI includes an optical axis AX1 of the reflected rays and an optical axis AX2 of the transmitting rays, and is in parallel with the paper surface. Further, a reference symbol $\theta_1$ is an angle formed between a normal to the first half mirror HM1 and the optical axis AX1 of the reflected rays.

In the view finder system shown in FIG. 9, a first mirror M1 is a half mirror which is used as a second half mirror HM2. A portion of rays which travel through the view finder system transmit the half mirror HM2 and are condensed by a light measurement lens 2 onto a light measurement element 3.

Further, a screen mat 4 is disposed at the intermediate image location $I_1$ and rays which have passed through a first condenser lens system CL1 disposed in the vicinity of the screen mat 4 are incident on the second half mirror HM2. A portion of the rays incident on the second half mirror HM2 are reflected toward a relay lens system RL, travel along an optical axis which is folded by a second mirror M2 as described above, are incident on a second condenser lens system CL2, emerge after travelling along an optical axis folded by a reflecting surface disposed in the second condenser lens system CL2 and form an image to be observed through an eyepiece optical system E.

The rest portion of the rays which have passed through the second half mirror HM2 are condensed by the light measurement lens 2 onto a light measurement element 3.

The optical system according to the present invention makes it possible to carry out light measurements with a high accuracy regardless of variations of a polarization degree caused dependently on objects owing to the fact that the surface of incidence of the first half mirror HM1 is disposed nearly perpendicular to the surface of incidence of the second half mirror HM2 as described above, whereby a variation tendency of an intensity of rays reaching an image pickup device of the image pickup system is substantially the same as that of rays reaching the light measurement element of the light measurement system even when general half mirrors which have reflectance for the P component higher than that for the S component are used.

When rays coming from an object comprise a large amount of component in a direction in parallel with the surface of incidence of the first half mirror HM1, i.e., the P component, for example, an amount of the S component is reduced in reflected rays out of rays incident on the first half mirror HM1 in correspondence to the large amount of the P component contained in the incident rays. Accordingly, an amount of rays which are reflected by the first half mirror and reach the image pickup device 1 is reduced.

When incident rays comprise the P component in a large amount, rays which have passed through the first half mirror HM1 reach the second half mirror HM2 as they are, but since the surface of incidence of the second half mirror HM2 is disposed perpendicularly to the surface of incidence of the first half mirror, the P component and the S component are incident as the S component and the P component respectively. Accordingly, the rays which comprise the P component in a large amount are incident on the second half mirror HM2 as rays which comprise the S component in a large amount.

Out of the rays incident on the second half mirror HM2, rays which are incident as the P component transmit through the second half mirror HM2 and are condensed by the light measurement lens 2 onto the light measurement element 3. Since the P component is polarized in the same direction as the rays incident on the image pickup device 1, an amount of rays incident on the light measurement element 3 is reduced when an amount of rays incident on the image pickup device 1 is reduced. When a larger amount of rays are incident on the image pickup device 1, in contrast, a larger amount of rays are incident on the light measurement element 3.

As understood from the foregoing description, the TTL light measurement system according to the present invention tends to equalize a variation degree of an amount of rays incident on the image pickup device 1 with a variation degree of an amount of rays incident on the light measurement element 3, thereby making it possible to carry out light measurements with a high accuracy.

Though the surface of incidence of the first half mirror HM1 and the surface of incidence of the second half mirror HM2 are disposed perpendicular to each other in the embodiments described above, it is sufficient to dispose both the surfaces of incidence so as to form an angle which satisfies the above mentioned conditions (11), (11-1), (11-2) or (11-3) and so on.

Variations of polarization characteristics of rays incident on half mirrors are related also to angles of incidence on the half mirrors. Speaking concretely, a large difference between angles of incidence on the first half mirror HM1 and the second half mirror HM2 produces a difference between a polarization characteristics of the first half mirror and the second half mirror, whereby an amount of rays incident on the image pickup device and an amount of rays incident on the light measurement element are varied at different degrees.

In the view finder according to the present invention, a difference $|\theta_1-\theta_2|$ between the angle $\theta_1$ of incidence on the first half mirror HM1 and the angle of incidence $\theta_2$ on the second half mirror HM2 within a range defined by the condition (12) as described above, so that the amounts of rays are not varied at different degrees.

When a relay lens system for erecting an image is disposed as in the view finder according to the present invention, it is desirable to dispose an optical axis $AX_R$ of the relay lens system so that it is included in a plane which is substantially perpendicular to optical axes $AX_1$ and $AX_2$. Further, it is desirable to dispose the second half mirror HM2 immediately before a surface of incidence of the relay lens system RL (an object side surface of the relay lens system).

A view finder optical system is generally configured so as to locate it pupil in a relay lens system RL. To enable average light measurements, on the other hand, it is convenient to dispose a light measurement position of a light measurement system at a location which is conjugate with a pupil of the view finder optical system. It is therefore desirable to dispose a light measurement lens of a light measurement system which is conjugate with the pupil of the view finder optical system. Accordingly, it is desirable to bring a surface of incidence of the relay lens system RL, of the view finder optical system close to the second half mirror HM2. When the surface of incidence is disposed far from the second half mirror HM2, the light measurement lens 2 of the light measurement system is also far from the second half mirror HM2, thereby hindering compact configuration of the light measurement system.

For the reason described above, the view finder according to the present invention is configured so as to satisfy the above-mentioned condition (13).

The view finder equipped with the TTL light measurement system according to the present invention is configured so as to satisfy the conditions (11), (12) and (13), and the first through fourth embodiments described above also satisfy these conditions.

In the first through fourth embodiments, $\phi$, $|\theta_1 - \theta_2|$, D(H) and L have values which are mentioned in the numerical data or listed below:

$\phi = 90°$ $|\theta_1 - \theta_2| = 5°$ ($\theta_1 = 30°$, $\theta_2 = 35°$)

D=5.6

L=10.45

At wavelengths $\lambda$=440 nm, 510 nm and 600 nm, the first half mirror HM1 and the second half mirror HM2 has transmittance $T_{1S}$, $T_{1P}$, $T_{2S}$, $T_{2P}$ and reflectance $R_{1S}$, $R_{1P}$, $R_{2S}$, $R_{2P}$ listed below:

TABLE 1

| | | $\lambda$ = 440 nm | $\lambda$ = 510 nm | $\lambda$ = 600 nm |
|---|---|---|---|---|
| first half mirror | $T_{1S}$ | 17.05 | 12.98 | 17.92 |
| | $T_{1P}$ | 44.10 | 47.76 | 44.99 |
| | $R_{1S}$ | 82.59 | 87.01 | 82.08 |
| | $R_{1P}$ | 55.56 | 52.23 | 55.01 |
| second half mirror | $T_{2S}$ | 14.03 | 14.11 | 13.96 |
| | $T_{2P}$ | 73.13 | 72.78 | 73.16 |
| | $R_{2S}$ | 85.49 | 85.87 | 86.04 |
| | $R_{2P}$ | 26.61 | 27.21 | 26.84 |

As listed in Table 1 shown above, splitting ratios of the first half mirror and the second half mirror, and a splitting ratio between the image pickup system and the light measurement system are as listed below:

(Splitting ratio of first half mirror)

View finder system:light measurement system=7:3

(Splitting ratio of second half mirror)

View finder system:light measurement system=6:4

Image pickup system:light measurement system=8:1

When a random polarization light (unpolarized light) is incident on the half mirrors having the transmittance and reflectance listed above, the photographic system, the light measurement system and the view finder system exhibit final average transmittance Ta, Tb and Tc listed in table 2 below:

TABLE 2

| | $\lambda$ = 440 nm | $\lambda$ = 510 nm | $\lambda$ = 600 nm |
|---|---|---|---|
| Ta = $(R_{1P} + R_{1S})/2$ | 69.08 | 69.62 | 68.55 |
| Tb = $(T_{1P}R_{2S} + T_{1S}R_{2P})/2$ | 21.12 | 22.27 | 21.76 |
| Tc = $(T_{1P}R_{2S} + T_{1S}R_{2P})/2$ | 9.33 | 8.09 | 9.07 |

When polarization of incident rays is deviated, polarization degrees a, b and c of the photographic system, the view finder system and the light measurement system are as listed in Table 3 below:

TABLE 3

| | $\lambda$ = 440 nm | $\lambda$ = 510 nm | $\lambda$ = 600 nm |
|---|---|---|---|
| a = $(R_{1P} - R_{1S})/(R_{1P} - R_{1S})$ | -19.6 | -25.0 | -19.7 |
| b = $(T_{1P}R_{2S} - T_{1S}R_{2P})/(T_{1P}R_{2S} + T_{1S}R_{2P})$ | 78.5 | 84.1 | 77.9 |
| c = $(T_{1P}T_{2S} - T_{1S}T_{2P})/(T_{1P}T_{2S} + T_{1S}T_{2P})$ | -33.7 | -16.7 | -35.2 |

When rays incident on the image pickup device are linearly polarized (consist only of the P component), the final average transmittance is as shown in Table 4 below:

TABLE 4

| | $\lambda$ = 440 nm | $\lambda$ = 510 nm | $\lambda$ = 600 nm |
|---|---|---|---|
| $Ta_{AVE}$ = Ta (1 + a) | 55.54 | 52.22 | 55.05 |
| $Tb_{AVE}$ = Tb (1 + b) | 37.70 | 41.00 | 38.71 |
| $Tc_{AVE}$ = Tc (1 + c) | 6.19 | 6.74 | 6.29 |

In Table 4 shown above, the reference symbols $T_{aV}$, $T_{bV}$ and $T_{cV}$ represent final average transmittance of the image pickup system, the view finder system and the light measurement system respectively.

At the wavelength $\lambda$=510 nm which is listed in Tables 2 and 4, the photographic system exhibits final average transmittance of 69.62% for random polarized light, whereas its final average transmittance is lowered to 52.22% for the P component.

At the same wavelength $\lambda$=510 nm, the light measurement system exhibits final average transmittance of 8.09% for a random polarized light, whereas its final average transmittance is lowered to 6.74% for the P component.

When the P component only is incident as in extreme examples shown in FIG. 4, the image pickup system exhibits final average transmittance which is lower than its final average transmittance for the random polarized light at all the wavelengths. However, the final average transmittance of the light measurement system is also lowered in the same tendency. Further, splitting ratio between the photographic system and the light measurement system remains constant regardless of polarized conditions.

Since splitting ratio between the photographic system and the light measurement system is kept nearly constant regardless of polarized conditions and amounts of rays are varied in the same direction, the measuring system preferred as the embodiment described above is capable of measuring light with a high accuracy.

The view finder according to the present invention is configured to occupy a small space, or is applicable sufficiently to compact cameras by shortening its total length and selecting optical axis folding points at adequate locations. Further, the TTL light measurement system is usable for measurements regardless of polarized degrees of rays from objects.

What is claimed is:

1. A view finder comprising: a first half mirror which reflects a portion of incident rays so as to lead them to an image pickup system and leads transmitting rays to a view finder system; and a second half mirror which leads rays having transmitted through said first half mirror to at least a light measurement system, wherein an angle $\phi$ formed between planes of incidence of said first half mirror and said second half mirror satisfies the following condition (11):

$$60° < \phi < 120° \tag{11}$$

2. A view finder according to claim 1 satisfying the following condition (12):

$$|\theta_1 - \theta_2| < 40° \tag{12}$$

wherein the reference symbol $\theta_1$ represents an angle formed between a normal to said first half mirror and an incident light bundle, and the reference symbol $\theta_2$ designates an angle formed between a normal to said second half mirror and an incident light bundle.

3. A view finder according to claim 1 or claim 2, comprising a relay lens system for erecting an intermediate image which is formed between said first half mirror and said second half mirror, wherein said view finder satisfies the following condition (13):

$$0.2L < D(H) < L \tag{13}$$

wherein the reference symbol D represents a distance as measured from an object side surface of said relay lens system to said second half mirror and the reference symbol L designates a size of said intermediate image.

4. A view finder according to claim 1 satisfying, in place of the condition (11), the following condition (11-1):

$$70° < \phi < 110° \tag{11-1}$$

5. A view finder according to claim 1 satisfying, in place of the condition (11), the following condition (11-2):

$$80° < \phi < 100° \tag{11-2}$$

6. A view finder according to claim 1 satisfying, in place of the condition (11), the following condition (11-3):

$$85° < \phi < 95° \tag{11-3}$$

7. A view finder according to claim 2 satisfying, in place of the condition (12), the following condition (12-1):

$$|\theta_1 - \theta_2| < 30° \tag{12-1}$$

8. A view finder according to claim 2 satisfying, in place of the condition (12), the following condition (12-2):

$$|\theta_1 - \theta_2| < 20° \tag{12-2}$$

9. A view finder according to claim 3 satisfying, in place of the condition (13), the following condition (13-1):

$$0.3L < D(H) < 0.9L \tag{13-1}$$

10. A view finder according to claim 3 satisfying, in place of the condition (13), the following condition (13-2):

$$0.4L < D(H) < 0.8L \tag{13-2}$$

* * * * *